(12) United States Patent
Wood

(10) Patent No.: US 8,111,984 B2
(45) Date of Patent: Feb. 7, 2012

(54) MATTE BOX ASSEMBLY

(76) Inventor: Dennis Wood, Thunder Bay (CA)

( * ) Notice: Subject to any disclaimer, the term of this patent is extended or adjusted under 35 U.S.C. 154(b) by 130 days.

(21) Appl. No.: 12/763,885

(22) Filed: Apr. 20, 2010

(65) Prior Publication Data

US 2010/0266273 A1    Oct. 21, 2010

Related U.S. Application Data

(60) Provisional application No. 61/170,694, filed on Apr. 20, 2009.

(51) Int. Cl.
*G03B 11/04* (2006.01)
(52) U.S. Cl. ........................... 396/534; 359/611
(58) Field of Classification Search .................... 396/71, 396/534, 544; 359/611, 612
See application file for complete search history.

(56) References Cited

U.S. PATENT DOCUMENTS

| 5,349,411 A | 9/1994 | Beauviala |
| 5,708,902 A | 1/1998 | Navarro |
| 2004/0151492 A1* | 8/2004 | Blok et al. ................... 396/534 |

* cited by examiner

*Primary Examiner* — Clayton E LaBalle
*Assistant Examiner* — Autumn Parker
(74) *Attorney, Agent, or Firm* — Ryan W. Dupuis; Kyle R. Satterthwaite; Ade & Company, Inc.

(57) ABSTRACT

A matte box assembly is arranged for use with a camera rig including a camera body supported on a pair of parallel and spaced apart mounting rails extending in a longitudinal direction. The matte box assembly includes a matte frame surrounding a lens opening for alignment with the camera lens and a filter mount to support a lens filter spanning the lens opening. A support frame is arranged to be mounted on the mounting rails of the camera rig onto which the matter frame is supported for pivotal movement about a vertical axis between an in-use position aligned with the camera lens and an out-of-use position offset to one side of the camera lens.

18 Claims, 5 Drawing Sheets

MATTE BOX ASSEMBLY

This application claims the benefit under 35 U.S.C.119(e) of U.S. provisional application Ser. No. 61/170,694, filed Apr. 20, 2009.

FIELD OF THE INVENTION

The present invention relates to a matte box assembly for use with a camera comprising a camera body supported on a pair of parallel and spaced apart mounting rails such that a matte frame of the matte box assembly is supported for pivotal movement relative to the mounting rails.

BACKGROUND

The use of matte boxes are known for reducing unwanted lens flare caused by lights or the sun, or for holding suitable glass or plastic filters in front of the lens. A common type of camera rig with which a matte box is used comprises two mounting rods which are supported parallel and spaced apart from one another to extend in a longitudinal direction. A camera body is anchored onto the rods at a first position thereon to be directed forwardly in the longitudinal direction for capturing images. Forwardly of the camera body along the rods, there is typically supported various accessories including for example an auxiliary lens, a lens adapter, or the matte box.

U.S. Pat. Nos. 5,708,902 by Navarro and 5,349,411 by Beauviala disclose examples of matte boxes supported on a pair of mounting rods of a camera rig as described above. In each instance there is provided a matte frame having a central lens opening therein arranged to be aligned with the lens of the camera such that filters which are supported to span the lens opening of the matte frame are positioned across the lens of the camera. Each of the assemblies further comprises a rail mount for fixed mounting onto the mounting rails of the camera rig. A support frame fixed to the rail mount is positioned towards one side only of the lens of the camera for supporting a hinge which pivotally couples the matte frame to the support frame for pivotal movement between an in-use position spanning the lens of the camera and an out-of-use position in which the camera lens is substantially unobstructed by the matte frame. In each instance the matte frame is unsupported at the opposing side from the hinges. Accordingly the matte frame is not supported in a stable manner and minor relative movements of the filters supported by the matte frame relative to the lens may cause distortions in the image being captured. Due to the support frame and hinges only supporting the matte frame on one side of the lens, the hinges are designed to be rather large and cumbersome as they are required to have sufficient clamping force to support the matte frame from only one side thereof.

SUMMARY OF THE INVENTION

According to one aspect of the invention there is provided a matte box assembly for use with a camera rig comprising a camera body supported on a pair of parallel and spaced apart mounting rails extending in a longitudinal direction and including a lens directed in the longitudinal direction of the mounting rails, the matte box assembly comprising:

a matte frame comprising a perimeter body surrounding a lens opening arranged for alignment with the lens of the camera and a filter mount arranged to support a lens filter spanning the lens opening;

a hood body supported on the matte frame about the lens opening to project outwardly from the matte frame generally in the longitudinal direction;

a rail mount arranged to be fixed on the mounting rails of the camera rig;

a support frame comprising a pair of upright side frame members supported in fixed relation to the rail mount at spaced apart positions so as to be arranged to receive the matte frame therebetween;

a hinge coupling one side of the matte frame to one of the side frame members of the support frame for relative pivotal movement of the matte frame about the side frame member between an in-use position in which the matter frame spans between the two side frame members such that the lens opening of the matte frame is arranged to be aligned with the lens of the camera rig and an out-of-use position in which the matte frame is pivoted outwardly away from the support frame relative to the in-use position such that the lens of the camera rig is arranged to be substantially unobstructed by the matte frame;

an anchor arranged to couple the other side of the matte frame to the other side frame member opposite the hinge in the in-use position such that the matte frame is arranged to be readily releasable from said other side frame member opposite the hinge for pivotal movement into the out-of-use position.

By providing two side members on the support frame onto which the matte frame is supported at opposing sides of the lens by the anchor and hinge respectively, a much smaller and less costly design of hinge can be employed while still supporting the matte frame more securely relative to the camera than prior art matte boxes supported by mounting rails of a camera rig.

By further providing a frame having two side members, an upper member and a lower member which are adjustable relative to one another with integral clamps formed thereon, the resulting frame is very simple in construction so as to be low in cost while also being highly adaptable to various configurations in a very stable and secure manner. The relative adjustment of the various components of the support frame further permits full height adjustment while maintaining the matte box protected from all sides. Various sizes of rail mounts can be integrally incorporated into the support frame to further enhance the adaptability of the matte box accord to the present invention.

The support frame may further comprise an upper frame member and a lower frame member spanning between the side frame members at spaced apart positions above the matte frame and below the matte frame respectively.

All of the frame members of the support frame are preferably supported for adjustment relative to one another.

The two side frame members may each comprise a rod member of continuous cross section, wherein the hinge, the anchor, and the upper and lower frame members are adjustably slidable along the side frame members.

The upper frame member may comprise at least one mounting channel formed centrally therein upon which a camera accessory is arranged to be secured.

The rail mount is preferably located on the lower frame member of the support frame.

The matte frame is preferably adjustable in height relative to the mounting channels on the upper frame member and the rail mount on the lower frame member.

When the support frame comprises a lower frame member spanning between the side frame members, the rail mount may be integrally formed within the lower frame member of the support frame such that the mounting rails of the camera rig are arranged to be clamped directly against the lower frame member.

The rail mount may further comprise a pair of apertures formed in the lower frame member including a slot extending outwardly therefrom such that an inner peripheral surface of the aperture is generally C-shaped. In this instance, a clamp fastener is preferably coupled between opposing free ends of the inner peripheral surface arranged for selectively clamping the inner peripheral surface about the respective mounting rail.

The lower frame member may further comprise a pair of integrally formed apertures arranged to receive respective ones of the side frame members therein, and a clamp fastener arranged to clamp the side frame members within the respective integrally formed apertures in the lower frame member.

The hinge may be supported on the respective side frame member for relative sliding movement along the side frame member such that a height of the matte frame relative to the support frame is adjustable.

The hinge may further comprise a pair of hinge elements spaced apart along the respective side frame member about which the hinge elements are rotatable, in which each of the hinge elements comprises a collar which is supported for rotation about a circular cross section of the side frame member.

When the hinge comprises a pair of hinge elements supported on the matte frame at spaced apart positions for pivotal movement on the side frame member and there is provided a positioning element surrounding the side frame member which spans a space between the hinge elements, the positioning element may be slidable along the side frame member such that a height of the matte frame relative to the support frame is adjustable. The positioning element may include a clamp fastener arranged to selectively fix a position of the positioning element along the side frame member at a selected height of the matte frame relative to the support frame.

Pivotal movement of the matte frame relative to the support frame from the in-use position to the out-of-use position is preferably restricted only by the anchor engaging the side frame member opposite the hinge.

The anchor is preferably adjustable in height along the side frame member together with the hinge along the other side frame member such that a height of the matte frame relative to the support frame is adjustable.

The anchor may comprise a first clamping element supported for sliding movement along the side frame member and a second clamping element which is pivotal with the matte frame relative to the support frame, wherein the first and second clamping elements are arranged to be selectively fixed in engagement with one another in the in-use position.

The first and second clamping elements may be arranged to be engaged with one another by a threaded connection.

One embodiment of the invention will now be described in conjunction with the accompanying drawings in which:

Figure 1:
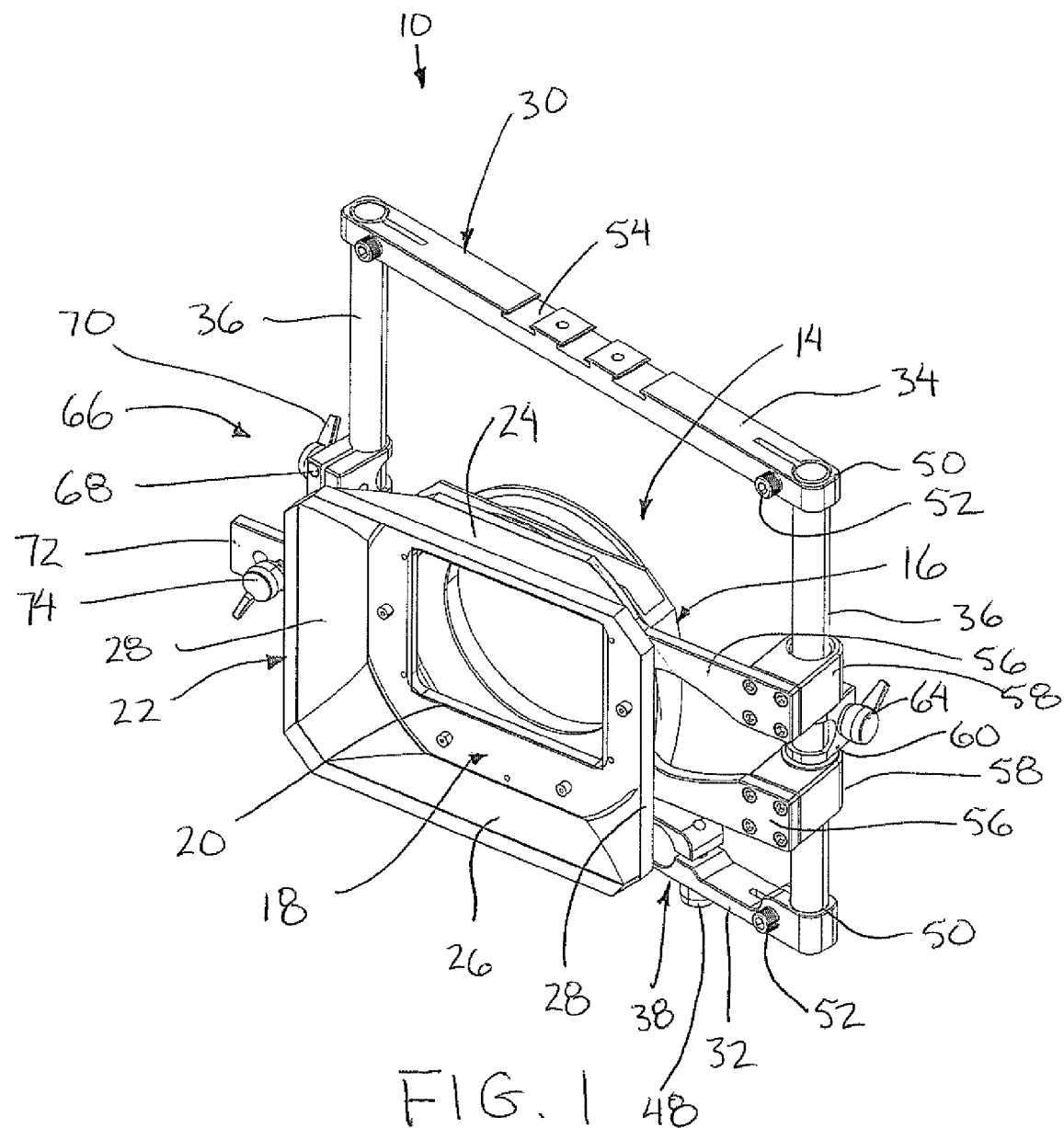
FIG. 1 is a perspective view of the matte box assembly illustrating a front side.
Figure 2:
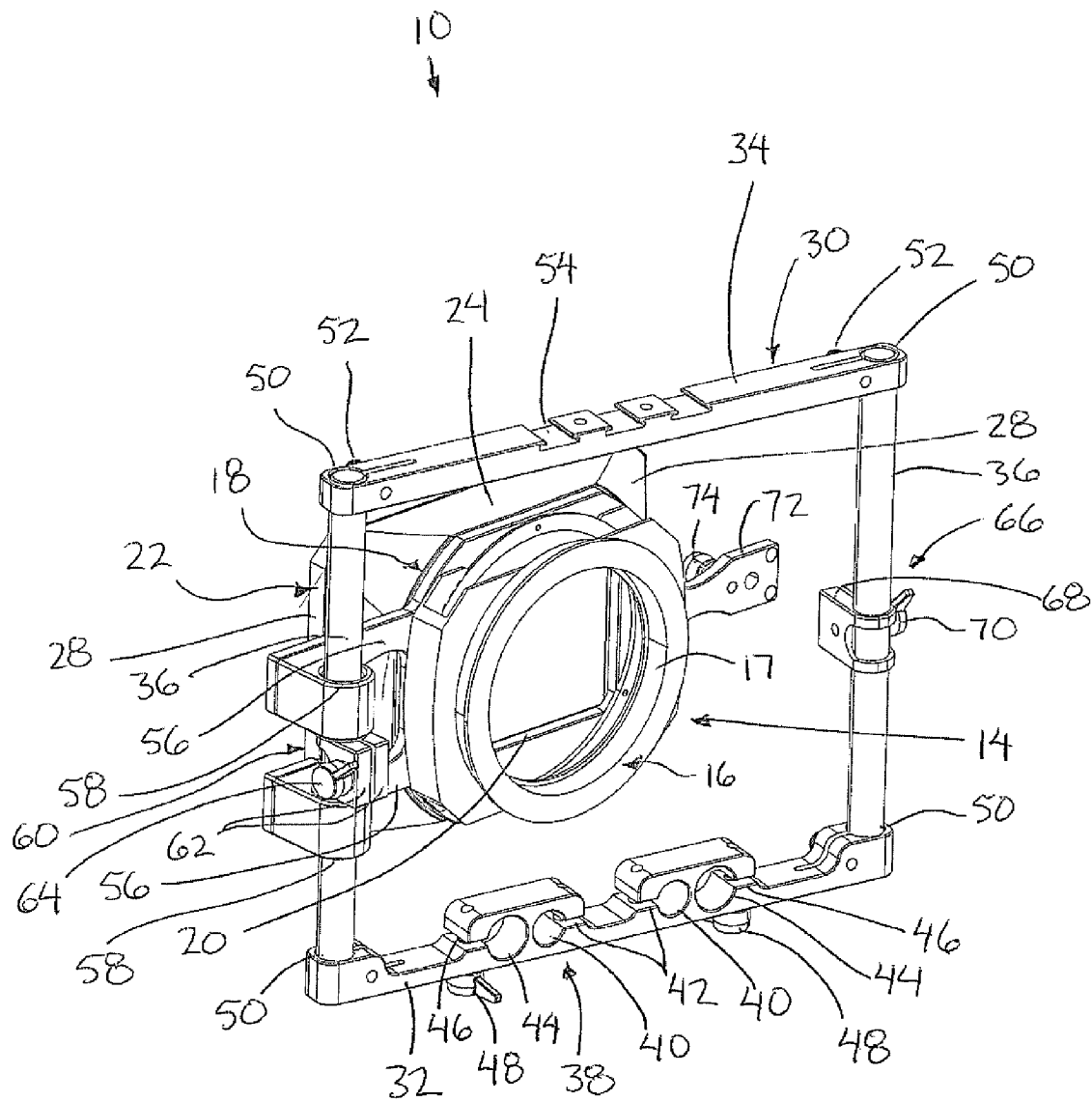
FIG. 2 is a perspective view of the matte box assembly illustrating a rear side.
Figure 3:
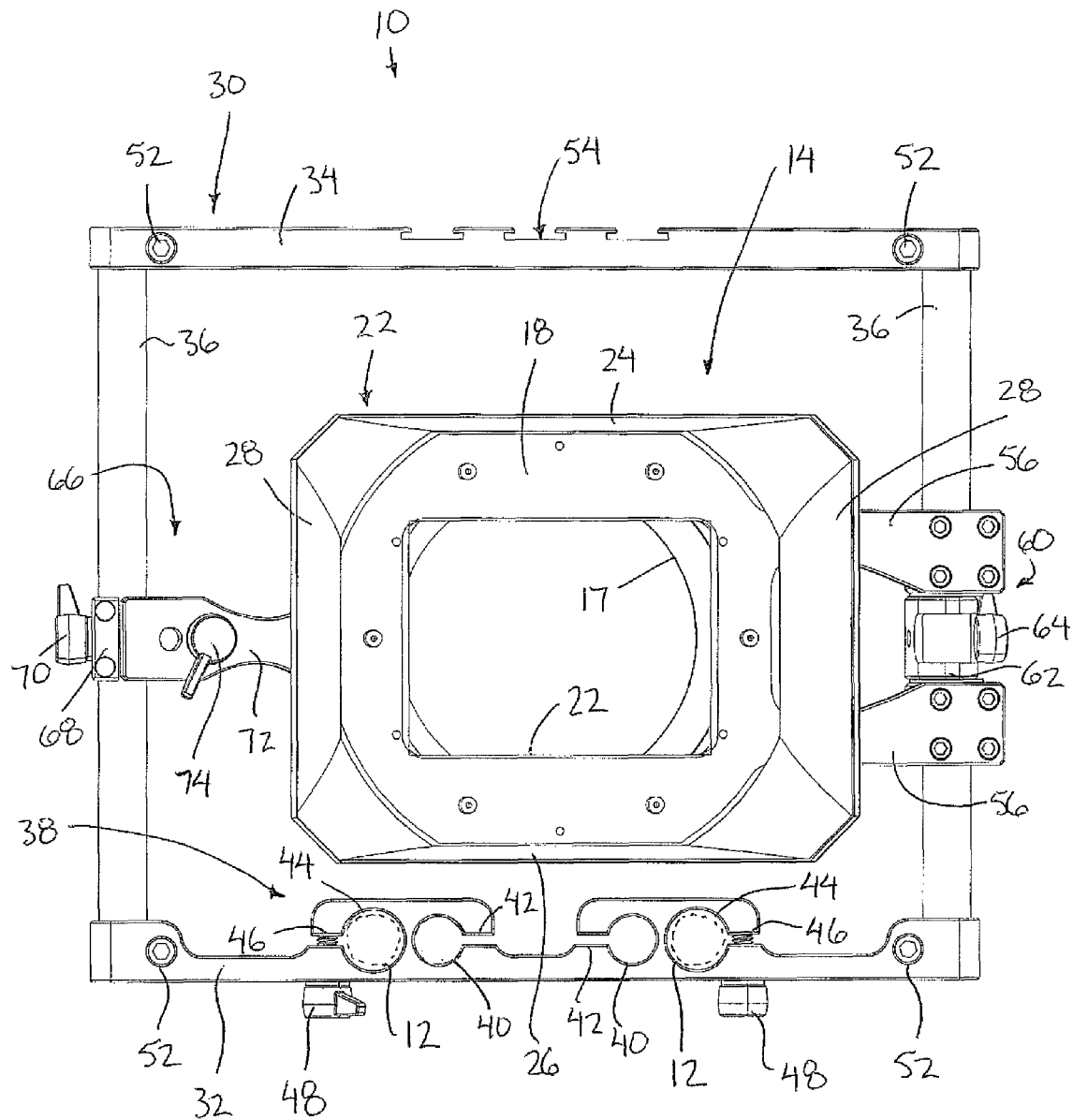
FIG. 3 is a front elevational view of the matte box assembly.
Figure 4:
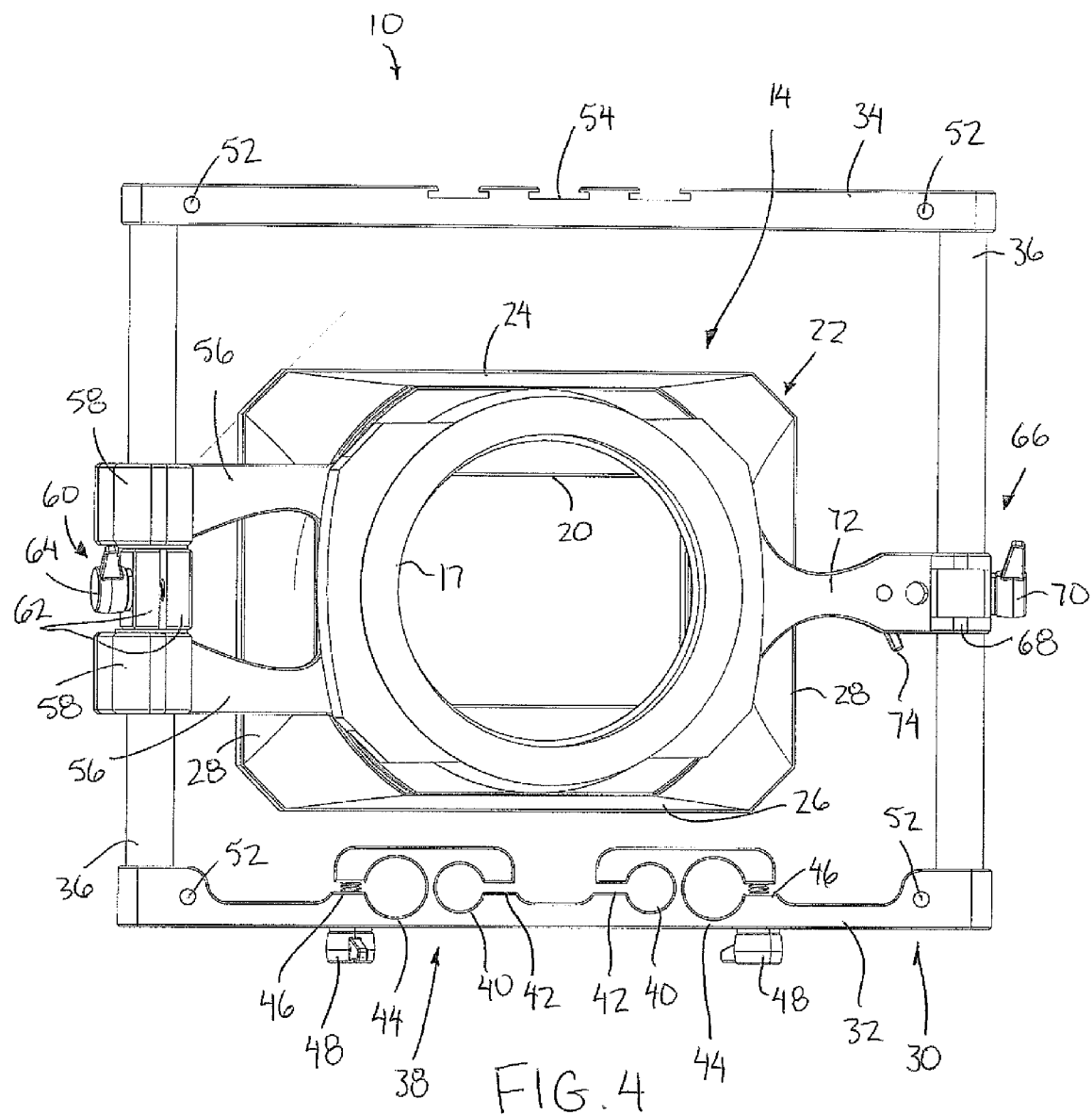
FIG. 4 is a rear elevational view of the matte box assembly.
Figure 5:
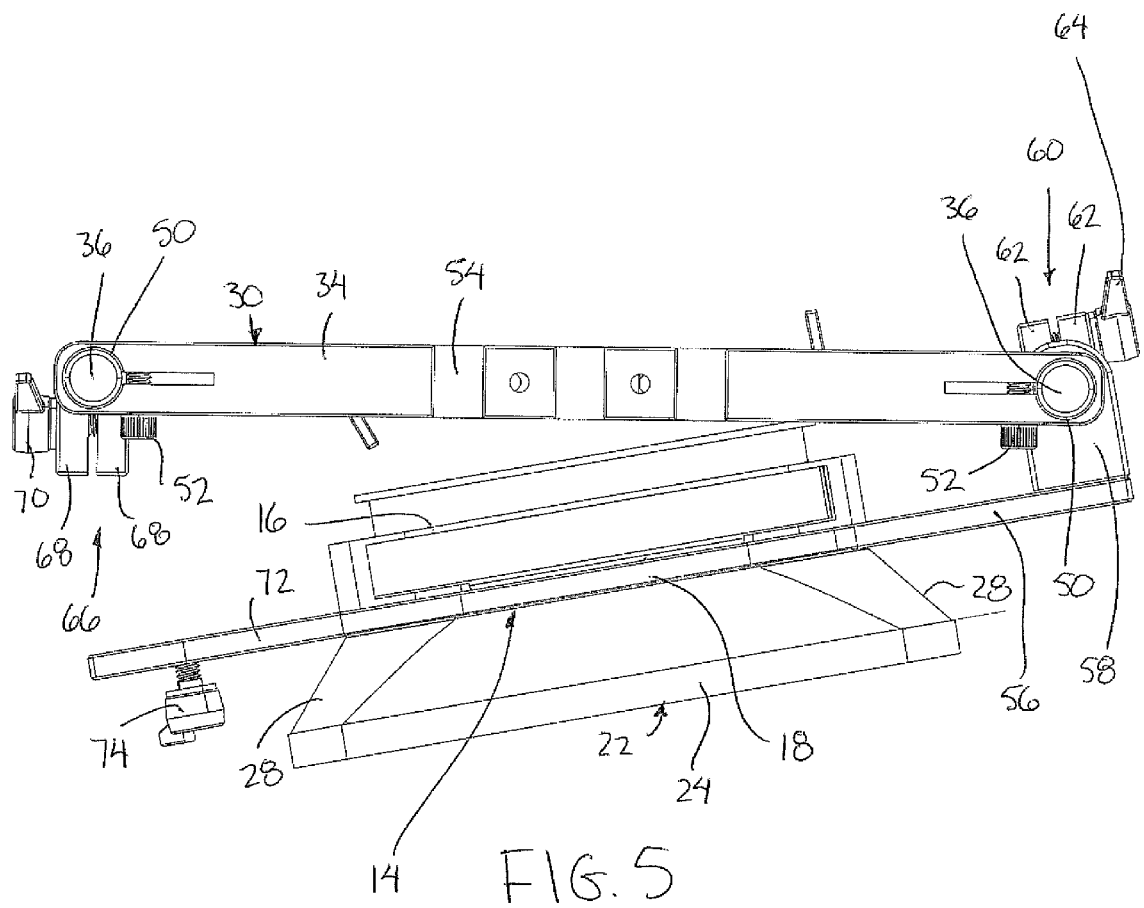
FIG. 5 is a top plan view of the matte box assembly.

In all of the figures the matte box assembly is shown with the matte frame pivoted partway between an in-use position and an out-of-use position.

In the drawings like characters of reference indicate corresponding parts in the different figures.

DETAILED DESCRIPTION

Referring to the accompanying figures there is illustrated a matte box assembly generally indicated by reference numeral 10. The assembly 10 is typically used with a camera rig comprising a camera body having a lens which is directed in a forward longitudinal direction to capture images. A pair of mounting rails 12 are supported parallel and spaced apart from one another to extend in the longitudinal direction of the camera along the full length of the camera rig. Various camera accessories including the matte box assembly 10 are supported on the mounting rails 12 so as to be in fixed relation to the camera body.

The matte box assembly generally comprises a matte frame 14 having an inner side 16 for mounting in close proximity about the lens of the camera and an outer side 18 positioned forwardly of the inner side upon which filters can be supported. The inner side 16 typically comprises a generally cylindrical collar 17 arranged to receive the lens of the camera therein. The outer side 18 comprises a plate having a rectangular lens opening 20 formed therein in concentric alignment with the collar 17 forming the inner side of the frame. The portion of the plate about the lens opening 20 at the outer side 18 of the matte frame defines a perimeter body about the opening having fastener mounts therein for fastening filters to the matte frame. The inner and outer sides of the matte frame are spaced apart and open to one another from the top side thereof for receiving various filters within the space between the inner and outer sides of the matte frame where they can subsequently be fastened into place.

The matte frame further comprises a hood body 22 in the form of a top flange 24, a bottom flange 26 and two side flanges 28 which form a generally rectangular shield about the lens opening. The flanges extend forwardly from the outer side of the matte frame at an outward incline away from one another to shield the lens from undesired glare.

The matte frame 14 is arranged to be pivotally supported on a support frame 30 of the matte box assembly. The support frame comprises a lower frame member 32 and an upper frame member 34 which are parallel and spaced apart at opposing top and bottom ends of the frame. Two side frame members 36 are connected between the upper frame member and the lower frame member at opposing ends thereof so as to be parallel and spaced apart from one another in a rectangular configuration with the upper and lower frame members. The four frame members of the support frame 30 have dimensions which are greater in width and height than the matte frame and surrounding hood body 22 so as to be spaced outwardly therefrom in all directions to full surround and protect the matte frame received centrally therein in the in-use position of the matte box assembly. In the in-use position, the matte frame lies generally in a common plane with the frame members of the support frame which are spaced outwardly therefrom.

The lower frame member 32 extends generally horizontally in a lateral direction between the opposing ends thereof supported on the bottom ends of the two side frame members 36. A rail mount 38 is integrally formed on the lower frame member for clamping the lower frame member and the remainder of the support frame in fixed relation onto the parallel and spaced apart mounting rails 12 of the camera rig.

More particularly the lower frame member 32 comprises a first pair of recesses 40 in the form of apertures extending in the longitudinal direction through the rail mount at evenly spaced positions in opposing directions from a centre of the lower frame member in the lateral direction. A slot 42 is connected between the inner surface of each recess 40 and an exterior surface of the lower frame member so that an inner peripheral surface of each recess 40 is generally C-shaped and integrally formed with the frame member 32. The recess 40 is suitably sized to slidably receive a respective one of the mounting rails therein such that providing a fastener secured between the free ends of the C-shaped periphery permits the inner peripheral surface to be clamped tightly about the mounting rod for selectively fixing the position of the rod relative to the lower frame member by frictional engagement.

In addition to the first pair of recesses 40, there is also provided a second pair of recesses 44 which are similar in configuration to the first pair but have a larger diameter for accommodating larger diameter mounting rods slidably therein.

The second recesses 44 are also evenly spaced in opposing directions from a center of the lower frame member 32 in the lateral direction at a spacing which is greater than the spacing of the first recesses 40. The second recesses 44 also comprise an aperture extending fully through the frame member 32 in the longitudinal direction with a slot 46 connecting the inner peripheral surface to an outer surface of the frame member 32 such that the inner peripheral surface is generally C-shaped about the respective mounting rail received therein. Fasteners 48 shown coupled between the free ends of the C-shaped inner peripheral surface permit the inner peripheral surfaces of the recesses 44 to be clamped about the respective rods forming the mounting rails.

At opposing ends of the lower frame member 32 sockets 50 are provided which extend vertically through the lower frame member 32 so as to be perpendicular to the orientation of the recesses 40 and 44 and so as to be oriented for slidably receiving the two side frame members 36 in a vertical orientation therethrough. Each of the two side frame members 36 comprises a round rod of circular cross section having a continuous diameter along the length thereof for being slidably received in the respective sockets. Each of the sockets comprises a generally cylindrical inner surface joined to a radially extending slot formed in the lower frame member so that the inner peripheral surface of the socket is again generally C-shaped so as to permit clamping of the inner peripheral surface about the frame member received therein by suitable fasteners 52 in threaded connection between the free ends of the C-shaped peripheral surface by connecting the fasteners to span the slotted gap similar to the sockets and recesses note above.

The upper frame member 34 also comprises two sockets 50 at opposing ends thereof which are similarly slotted to permit clamping about the top ends of the respective side frame members 36 using suitable fasteners 52 spanning across the slotted gaps of the sockets.

A top side of the upper frame member 34 comprises a plurality of channels 54 formed therein which extend in the longitudinal direction of the mounting rails from the front to the back side of the upper frame member. Each channel comprises a recessed formation including inwardly projecting retainer flanges along opposing sides of each channel spaced upwardly from the bottom of the channel at the top side of the frame member for selectively retaining various accessories to be mounted therein.

Due to the construction of the sockets and recesses which can be loosened to permit relative sliding of the various components or fastened to fix the position and orientation of all of the frame members relative to one another and relative to the mounting rails, the resulting support frame is highly adjustable as all of the frame members are adjustable relative to one another. More particularly, the upper and lower frame members are both adjustable in height relative to the matte frame supported on the side members of the support frame.

The perimeter body of the matte frame is supported on the two side members of the support frame at diametrically opposed sides of the lens opening in the matte frame. The plate forming the outer side 18 of the matte frame includes two hinge arms 56 formed integrally in a common plane therewith to extend laterally outward from one side of the matte frame for connection to a respective one of the two side frame members of the support frame. The two hinge arms 56 are generally parallel and vertically spaced apart from one another so as to extend generally horizontally from one side of the matte frame to the side frame member of the support frame. The outer ends of the hinge arms are mounted on respective collars 58 having vertically oriented apertures formed therein in alignment with one another for slidably and rotatably receiving the round rod defining the side member of the support frame therein. Each collar 58 defines one hinge element of a common hinge which pivotally supports the matte frame onto the support frame for free pivotally movement about a vertical axis therebetween.

To position the height of the hinge elements 58, and accordingly the matte frame supported thereon relative to the support frame, a hinge positioning element 60 is mounted on the side member in between the two hinge elements. The positioning element 60 has a height which is substantially equal to the vertical space between the two collars 58 forming the hinge elements. In this manner by fixing the position of the positioning element 60 along the side frame member, the single positioning element is arranged to restrict both upward and downward movement of the two hinge elements relative to the side frame member without interfering with the relative pivotal movement of the hinge elements about the side frame member so that the hinge remains a free pivotal hinge for unrestricted pivotal movement of the matte frame relative to the support frame.

The positioning element 60 comprises a clamping block including two clamping portions 62 to arrange to engage opposing sides of the side member. A suitable clamp fastener 64 is joined between the two clamping portions 62 to engage the two clamping portions towards one another and frictionally clamp the side frame member therebetween at the selected height along the side frame member.

In order to fix the position of the matte frame such that the plate forming the outer side is perpendicular to the longitudinal forward direction of the camera with the collar 17 at the inner side of the matte frame receiving the lens of the camera therein in the in use position, a suitable anchor 66 is provided which selectively fixes the side of the matte frame opposite the hinges to the side frame member of the support frame which is also opposite the hinges.

The anchor 66 comprises a first clamping element comprising two clamping portions 68 similar to the clamping portion 62 of the positioning element. The two clamping portions 68 of the first clamping element include a clamping fastener 70 coupled therebetween to urge the two clamping portions towards one another for frictionally engaging the respective one of the side frame members therebetween. By loosening the fastener 70 the first clamping element of the anchor can be slidably displaced vertically along the respective side frame member to any one of a number of selected heights therealong.

The second clamping element of the anchor 66 comprises an anchor arm 72 which is an integrally formed portion of the plate forming the outer side of the matte frame to extend laterally outward from the matte frame opposite the hinge arms at a height which is approximately centered between the two hinge arms. The anchor arm 72 is arranged to span the distance laterally from the respective side of the matter frame to the respective side frame member of the support frame spaced outwardly therefrom. A suitable fastener 74 received through a respective aperture at the free end of the anchor arm is arranged for selective mating in threaded connection with the first clamping element clamped to the side frame member of the support frame by aligning the first and second clamping elements with one another in the in-use position of the matte frame.

Where it is desired to change the height of the matte frame relative to the support frame fixed onto the mounting rails of the camera rig, the user initially releases the first and second clamping elements of the anchor from one another and then loosens the fastener of the positioning element 60 so that the hinge elements can be slidably displaced in a vertical direction along the respective side frame member until the desired height is reach. Clamping the fastener 64 of the positioning element 60 preserves the selected height of the matte frame relative to the support frame. The user is then free to pivot the matte frame from an in-use position in which the plate of the outer side is parallel to a common plane of the frame members of the support frame and perpendicular to the longitudinal direction of the camera and an out-of-use position in which the matte frame is pivoted forwardly and laterally outwardly away from the lens of the camera such that the lens of the camera is substantially unobstructed by the matte frame.

Where it is desired to maintain the matte frame in the in-use position, the first and second clamping elements of the anchor 66 are aligned with one another by adjusting the height of the second element along the respective side frame member of the support frame and subsequently fastening the first and second elements together with the threaded fastener 74 of the anchor. Where further accessories are supported on the upper frame member of the support frame, height of the upper frame member relative to the lower frame member fixed onto the rails can be adjusted by adjusting the position of either of the upper or lower frame members along the side frame members respectively.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A matte box assembly for use with a camera rig comprising a camera body supported on a pair of parallel and spaced apart mounting rails extending in a longitudinal direction and including a lens directed in the longitudinal direction of the mounting rails, the matte box assembly comprising:
   a matte frame comprising a perimeter body surrounding a lens opening arranged for alignment with the lens of the camera and a filter mount arranged to support a lens filter spanning the lens opening;
   a hood body supported on the matte frame about the lens opening to project outwardly from the matte frame generally in the longitudinal direction;
   a rail mount arranged to be fixed on the mounting rails of the camera rig;
   a support frame comprising a pair of upright side frame members supported in fixed relation to the rail mount at spaced apart positions so as to be arranged to receive the matte frame therebetween;
   a hinge coupling one side of the matte frame to one of the side frame members of the support frame for relative pivotal movement of the matte frame about the side frame member between an in-use position in which the matter frame spans between the two side frame members such that the lens opening of the matte frame is arranged to be aligned with the lens of the camera rig and an out-of-use position in which the matte frame is pivoted outwardly away from the support frame relative to the in-use position such that the lens of the camera rig is arranged to be substantially unobstructed by the matte frame;
   an anchor arranged to couple the other side of the matte frame to the other side frame member opposite the hinge in the in-use position such that the matte frame is arranged to be readily releasable from said other side frame member opposite the hinge for pivotal movement into the out-of-use position.

2. The matte box assembly according to claim 1 wherein the support frame further comprises an upper frame member and a lower frame member spanning between the side frame members at spaced apart positions above the matte frame and below the matte frame respectively.

3. The matte box assembly according to claim 2 wherein all of the frame members of the support frame are supported for adjustment relative to one another.

4. The matte box assembly according to claim 2 wherein the two side frame members each comprise a rod member of continuous cross section, the hinge, the anchor, and the upper and lower frame members being adjustably slidable along the side frame members.

5. The matte box assembly according to claim 2 wherein the upper frame member comprises at least one mounting channel formed centrally therein upon which a camera accessory is arranged to be secured.

6. The matte box assembly according to claim 5 wherein the matte frame is adjustable in height relative to the mounting channels on the upper frame member.

7. The matte box assembly according to claim 2 wherein the rail mount is located on the lower frame member of the support frame.

8. The matte box assembly according to claim 7 wherein the matte frame is adjustable in height relative to the rail mount on the lower frame member.

9. The matte box assembly according to claim 1 wherein the support frame comprises a lower frame member spanning between the side frame members, the rail mount being integrally formed within the lower frame member of the support frame such that the mounting rails of the camera rig are arranged to be clamped directly against the lower frame member.

10. The matte box assembly according to claim 9 wherein the rail mount comprises a pair of apertures formed in the lower frame member including a slot extending outwardly therefrom such that an inner peripheral surface of the aperture is generally C-shaped, and wherein there is provided a clamp fastener coupled between opposing free ends of the inner peripheral surface arranged for selectively clamping the inner peripheral surface about the respective mounting rail.

11. The matte box assembly according to claim 9 wherein the lower frame member comprises a pair of integrally formed apertures arranged to receive respective ones of the side frame members therein, and wherein there is provided a clamp fastener arranged to clamp the side frame members within the respective integrally formed apertures in the lower frame member.

12. The matte box assembly according to claim 1 wherein the hinge is supported on the respective side frame member for relative sliding movement along the side frame member such that a height of the matte frame relative to the support frame is adjustable.

13. The matte box according to claim 1 wherein the hinge comprises a pair of hinge elements spaced apart along the respective side frame member about which the hinge elements are rotatable, each of the hinge elements comprising a collar which is supported for rotation about a circular cross section of the side frame member.

14. The matte box assembly according to claim 1 wherein the hinge comprises a pair of hinge elements supported on the matte frame at spaced apart positions for pivotal movement on the side frame member, and wherein there is provided a positioning element surrounding the side frame member which spans a space between the hinge elements, the positioning element being slidable along the side frame member such that a height of the matte frame relative to the support frame is adjustable, and the positioning element including a clamp fastener arranged to selectively fix a position of the positioning element along the side frame member at a selected height of the matte frame relative to the support frame.

15. The matte box assembly according to claim 1 wherein pivotal movement of the matte frame relative to the support frame from the in-use position to the out-of-use position is restricted only by the anchor engaging the side frame member opposite the hinge.

16. The matte box assembly according to claim 1 wherein the anchor is adjustable in height along the side frame member together with the hinge along the other side frame member such that a height of the matte frame relative to the support frame is adjustable.

17. The matte box assembly according to claim 1 wherein the anchor comprises a first clamping element supported for sliding movement along the side frame member and a second clamping element which is pivotal with the matte frame relative to the support frame, the first and second clamping elements being arranged to be selectively fixed in engagement with one another in the in-use position.

18. The matte box assembly according to claim 17 wherein the first and second clamping elements are arranged to be engaged with one another by a threaded connection.

* * * * *